(12) United States Patent
Cheng et al.

(10) Patent No.: US 6,505,472 B1
(45) Date of Patent: Jan. 14, 2003

(54) CRYOGENIC CONDENSATION SYSTEM

(75) Inventors: Alan Cheng, Livingston, NJ (US); Simon Ho, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 8 days.

(21) Appl. No.: 09/931,901

(22) Filed: Aug. 20, 2001

(51) Int. Cl.[7] .................. F25D 17/06; B01D 9/04; F25J 3/00
(52) U.S. Cl. .................. 62/93; 62/643; 62/532
(58) Field of Search ................ 62/643, 93, 532

(56) References Cited

U.S. PATENT DOCUMENTS

| | | | |
|---|---|---|---|
| 957,170 A | * 5/1910 | Levy et al. .............. 62/643 |
| 3,557,557 A | * 1/1971 | Prachar ................. 60/257 |
| 4,410,035 A | * 10/1983 | White ................... 165/111 |
| 5,144,807 A | * 9/1992 | Brown ................... 62/643 |
| 5,540,057 A | * 7/1996 | Cheng ................... 62/625 |
| 5,701,745 A | 12/1997 | Cheng et al. ............ 62/51.1 |
| 5,737,926 A | 4/1998 | Chen .................... 62/50.2 |
| 5,763,544 A | 6/1998 | Cheng et al. ............ 526/78 |
| 5,943,869 A | 8/1999 | Cheng et al. ............ 62/121 |
| 5,956,972 A | * 9/1999 | Naumovitz .............. 62/643 |
| RE36,435 E | * 12/1999 | Grenier et al. .......... 62/643 |
| 6,155,078 A | * 12/2000 | Miyasita et al. ......... 62/643 |

* cited by examiner

*Primary Examiner*—William C. Doerrler
(74) *Attorney, Agent, or Firm*—Stanley Ktorides

(57) ABSTRACT

A method and condenser apparatus for cleaning a gas of condensable vapor employing a cryogenic liquid which is caused to boil evenly along the condenser length and wherein the gas flow through the condenser is in the downward direction in evenly divided flows countercurrently to the flow of boiled cryogen.

11 Claims, 2 Drawing Sheets

CRYOGENIC CONDENSATION SYSTEM

TECHNICAL FIELD

This invention relates generally to removing a condensable vapor, such as water vapor, from a gas stream.

BACKGROUND ART

Freeze drying is a sublimation process that removes free water in the form of ice. Freeze drying is especially useful in the pharmaceutical industry to remove water from biological products because it preserves the integrity of the biological products. In freeze drying the water-containing product is frozen and, under vacuum with the partial pressure of water vapor reduced below the triple point of water, the frozen water sublimes and the sublimated ice is removed from the dryer.

Freeze drying has traditionally been carried out commercially using mechanical freezing systems. However, the refrigerant, such as for example a Freon, which is generally used with such mechanical devices has been deemed environmentally deleterious and is being eliminated from commercial use. Replacement refrigerants are not as thermodynamically effective making their use in the demanding application of freeze drying problematic. Moreover, replacement refrigerants for mechanical chillers are generally corrosive and toxic and require different compression ratios, making their use expensive from an operational standpoint. Moreover, an additional intermediate heat transfer fluid is needed and this has severe limitations on the temperature ranges that can be achieved.

A recent significant advancement in the field of freeze drying is the cryogenic cold shelf, disclosed and claimed in U.S. Pat. No. 5,701,745—Cheng et al., which uses a cryogenic fluid rather than mechanical refrigeration to carry out the freeze drying.

In practices, such as the use of cryogenic fluid to effect freeze drying, the fluid becomes loaded with water vapor which must be removed. Although mechanical refrigeration may be used for this purpose, it is disadvantageous to do so because very low temperatures are needed in order to cause the frozen water vapor to migrate out of the freeze dryer. Very low temperatures are costly to achieve using mechanical refrigeration systems. Moreover, mechanical refrigeration systems typically employ refrigeration fluids which may be damaging to the environment.

Accordingly, it is an object of this invention to provide a system for effectively removing a condensable vapor, such as water vapor, from a gas stream which can operate effectively at very low or cryogenic temperatures.

SUMMARY OF THE INVENTION

The above and other objects, which will become apparent to those skilled in the art upon a reading of this disclosure, are attained by the present invention, one aspect of which is:

A method for removing condensable vapor from a gas stream comprising:
(A) passing liquid cryogen into a condenser comprising a plurality of spaced vertically oriented cryogen passageways, each cryogen passageway having an outer surface, and a plurality of channels, each channel having an entrance and an exit and bordered at least in part by an outer surface of a cryogen passageway;
(B) boiling the liquid cryogen within the condenser to produce cryogen vapor, and passing cryogen vapor upwardly within the cryogen passageways;
(C) passing a gas stream containing condensable vapor into the condenser, directing the gas stream to the entrances of the channels, and distributing the gas stream for substantially equal flow within the channels;
(D) passing the gas stream downwardly through the channels and condensing condensable vapor out from the gas stream onto the outer surfaces of the cryogen passageways to form a clean gas stream; and
(E) withdrawing the clean gas stream from the exits of the channels.

Another aspect of the invention is:

A cryogenic condenser comprising:
(A) a housing containing a liquid cryogen reservoir and a plurality of spaced vertically oriented cryogen passageways, each cryogen passageway in flow communication with the liquid cryogen reservoir;
(B) means for passing liquid cryogen from outside the housing into the liquid cryogen reservoir;
(C) a gas stream inlet communicating with the housing, and a plurality of vertically oriented channels within the housing, each channel having an entrance and an exit;
(D) means for directing a gas stream from the gas stream inlet to the entrances of the channels, and means for distributing the gas stream for substantially equal flow within the channels; and
(E) a gas stream outlet for passing the gas stream collecting at the exits of the channels out from the housing.

Figure 1:
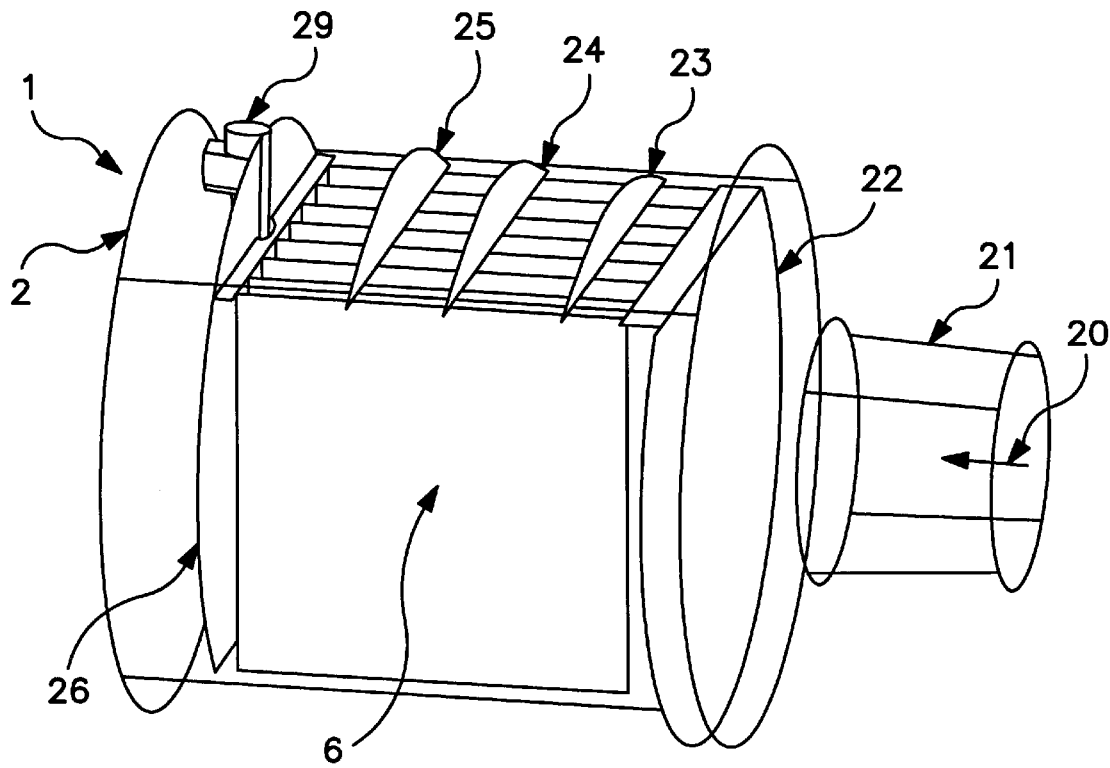
FIG. 1 is a representation of a preferred embodiment of the cryogenic condenser of this invention illustrating certain condenser intervals.

The numerals in the Drawings are the same for the common elements.

DETAILED DESCRIPTION

The invention will be described in detail with reference to the Drawings. Referring now to FIGS. 1–4, cryogenic condenser 1 comprises a housing 2 which envelopes or houses the internal structures of the cryogenic condenser. Liquid cryogen is passed in inlet 3 into liquid cryogen reservoir 4 which is within housing 2. The liquid cryogen passed into the cryogenic condenser through inlet 3 generally has a temperature of not more than −80° C. The preferred liquid cryogen for use in the practice of this invention is liquid nitrogen. Other fluids or fluid mixtures which can be employed as the liquid cryogen in the practice of this invention include liquid argon, liquid oxygen, liquid helium and liquid air.

The liquid cryogen boils within the condenser to form cryogen vapor. The cryogen vapor flows upwardly within a plurality of spaced vertically oriented cryogen passageways 5 which are in flow communication with the liquid cryogen reservoir. In the embodiment of the invention illustrated in the Drawings, the vertically oriented cryogen passageways are each formed by two facing condensation plates such as condensation plate 6. Alternatively vertically oriented condenser pipes may be employed as the cryogen passageways.

Figure 2:
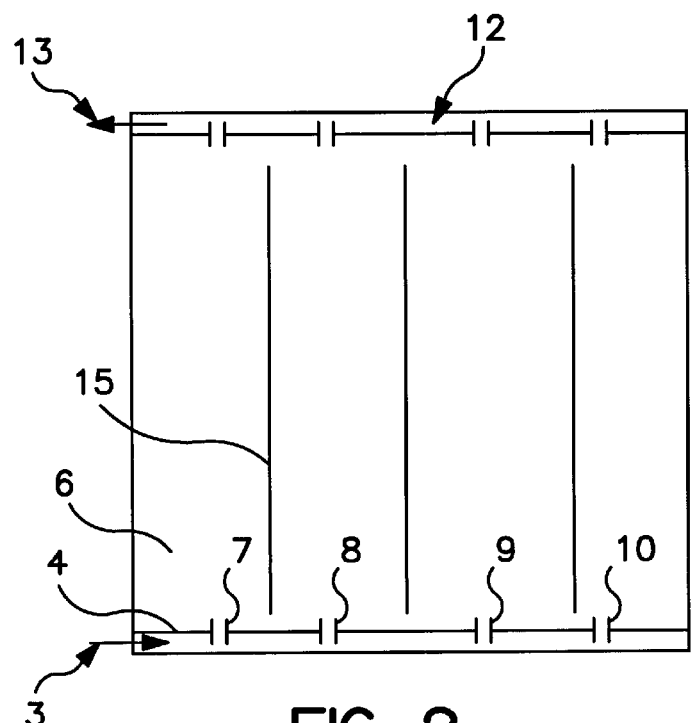
FIG. 2 is a simplified cross-sectional front or elevation view of the cryogenic condenser shown in FIG. 1 illustrating a cryogen passageway.

It is an important aspect of this invention that the liquid cryogen boils uniformly across the length of the condenser, and that the resulting cryogen vapor flows substantially vertically upward through the height of the condenser and in substantially equal flow upwardly within the cryogen passages. FIG. 2 illustrates one preferred arrangement for accomplishing this. As shown in FIG. 2, liquid cryogen flows into one end of condenser 1, which in FIG. 2 is the left end, into liquid cryogen reservoir 4. Along the length of reservoir 4 are apertures of increasing size, i.e. cross sectional area, from the liquid cryogen inlet. In the embodiment illustrated in FIG. 2, aperture 7 has a diameter of 0.75 inch, aperture 8 has a diameter of 1.0 inch, aperture 9 has a diameter of 1.25 inch, and aperture 10 has a diameter of 1.5 inch. The apertures serve to put liquid cryogen reservoir 4 into flow communication with the internal volume of the cryogen passageways 5. The internal volume of one of the passageways 5 is illustrated in FIG. 2. The increasing size of the apertures serves to evenly distribute the boiling cryogen across the length of the condenser within the cryogen passageways. As illustrated in FIG. 2, the internal surfaces of the cryogen passageways may have one or more vertically running baffles 15 which enhanced the vertical flow of the cryogen vapor for the improved efficiency of the operation of the condenser.

Another arrangement for establishing substantially equal upward flow of the vaporized cryogen in the cryogen passageways is to employ a manifold design to optimize the inlet size of the liquid cryogen reservoir and the inlet size to each of the cryogen passageways. Maintaining a constant pressure inside the reservoir ensures a substantially even flow distribution to each cryogen passageway. Providing channels within the condenser reduces or eliminates flow recirculation and minimizes pressure drop caused by flow recirculation and phase change, and independent inlets and outlets for each channel prevents flow crossing and interference.

Figure 3:
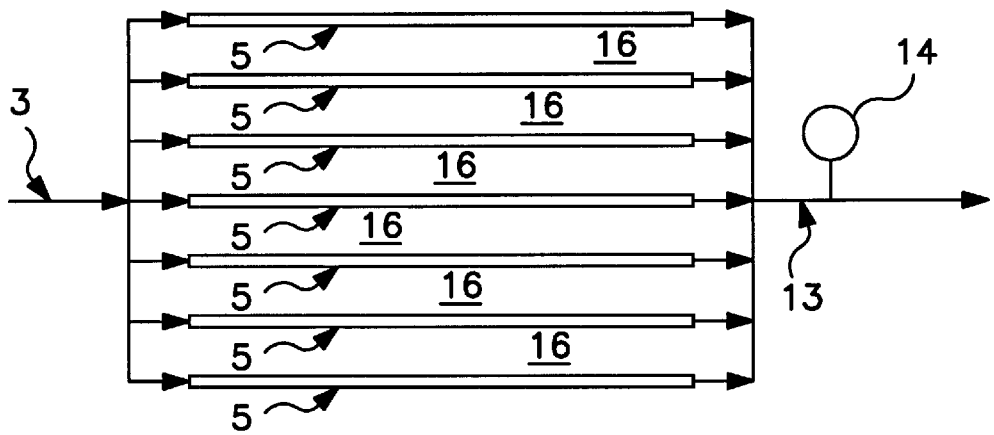
FIG. 3 is a simplified top or plan view of the cryogenic condenser shown in FIG. 1 showing the cryogen passageways and the gas stream flow channels.
Figure 4:
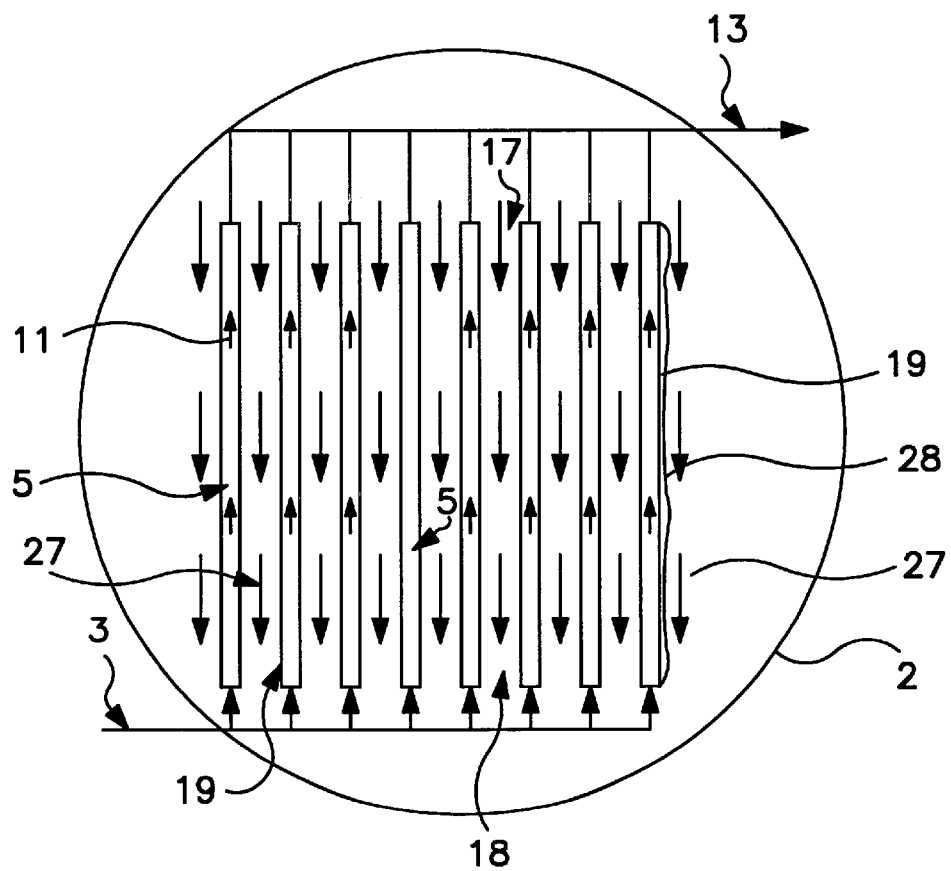
FIG. 4 is a simplified side cross sectional view of the cryogenic condenser shown in FIG. 1 showing the upflowing cryogen vapor and the downflowing gas stream.

The cryogen vapor flows upwardly within the cryogen passageways as shown in FIG. 4 by flow arrows 11 serving to cool the walls of the cryogen passageways. The resulting warmed cryogen vapor is collected in cryogen collector volume 12 and passed out of condenser 1 in cryogen vapor outlet 13. As shown in FIG. 3, the temperature of the cryogen vapor exhausted from condenser 1 in outlet 13 is monitored by temperature sensor 14 which serves to control the flow of liquid cryogen into the condenser to ensure sufficient refrigeration without flooding. If the temperature of the cryogen vapor exhaust is above the desired setpoint, the flow of liquid cryogen into the condenser is increased and if the temperature of the cryogen vapor exhaust is below the desired setpoint, the flow of liquid cryogen into the condenser is decreased.

The condenser has a plurality of channels 16, each channel having an entrance 17 in the upper portion of the condenser and an exit 18 in the lower portion of the condenser. Typically each of the entrances are in the same horizontal plane, i.e. at the same level, and each of the exits are also in the same horizontal plane. Each channel is bordered at least in part by an outer surface of a cryogen passageway which is receiving refrigeration from the upwardly flowing cryogen vapor within the cryogen passageways.

A gas stream 20 containing condensable vapor is passed within gas stream inlet 21, which communicates with housing 2, into condenser 1. Typically the gas stream comprises nitrogen gas and the condensable vapor is water vapor such as might be exhausted from a freeze dryer. The gas stream is directed to the entrances of the channels at the upper portion of the condenser. In the embodiment of the invention shown in FIG. 1, the gas stream 20 is passed to front baffle 22 which contacts the inside surface of housing 2 at the bottom and along the sides of housing 2 but does not extend to the inside surface of housing 2 at the upper portion of the condenser. In this way gas stream 20, which flows into and through condenser 1 by a pressure gradient produced by either positive pressure at the gas inlet or a vacuum at the gas outlet, is blocked from passing through the condenser except by passing to the upper portion of the condenser and into the entrances 17 of channels 16.

It is an important aspect of this invention that the gas stream containing the condensable vapor be distributed evenly, i.e. for substantially equal flow, within the channels. In the embodiment of the invention illustrated in FIG. 1 this distribution is accomplished by a series of baffles of increasing height from the level of the entrances of the channels. In the embodiment illustrated in FIG. 1, three such baffles 23, 24 and 25 are employed, wherein baffle 24 has a greater height than baffle 23 and baffle 25 has a greater height than baffle 24. As gas stream 20 flows past the top edge of front baffle 22, the lower most portion of stream 20 contacts baffle 23 and proceeds downward to entrances 17 while the upper portion of stream 20 flows passed baffle 23. The lower portion of stream 20 which flows over the top of baffle 23 contacts baffle 24 and proceeds downward to entrances 17 while the upper portion flows passed baffle 24. The lower portion of this flow contacts baffle 25 and proceeds downward to entrances 17, while the upper portion flows passed baffle 25 where it contacts rear baffle 26 and then proceeds downward to entrances 17.

The gas stream flows in substantially equal amounts downwardly through channels 16 as shown by flow arrows 27. As the gas stream flows downwardly through the channels the condensable vapor condenses and generally freezes onto the outer surfaces 19 of the cryogen passageways. This is shown in FIG. 4 on one of the outer surfaces 19 as condensate 28. As the gas stream completes the downward traverse of channels 16 it emerges therefrom through channel exits 18 as clean gas containing little or no water vapor or other condensable vapor which could be condensed at the temperature provided by the cryogen.

The clean gas stream collects in the lower portion of the condenser and flows out of condenser 1 in gas stream outlet 29. In the embodiment illustrated in FIG. 1 rear baffle 26 serves to seal off most of the condenser for gas stream flow, similar to the manner that front baffle 22 seals off flow, except that the open area is at the lower portion of the condenser below the level of the channel exits 18. That is, rear baffle 26 contacts the inside surface of housing 2 at the top of and along the sides except for this lower portion. The clean gas stream then passes through this unsealed area and into an outlet conduit for passage out from housing 2 in outlet 29.

Periodically, when the amount of condensate on the outer surfaces of the cryogenic passageways builds up to the point where operating efficiency is compromised, the condenser is defrosted and drained of condensate and then returned to service.

Now by the use of this invention one may effectively employ low temperature refrigeration from a boiling liquid cryogen to clean a gas stream of condensable vapor such as might have been exhausted from a freeze dryer.

Although the invention has been described in detail with reference to a certain preferred embodiment, those skilled in the art will recognize that there are other embodiments of the invention within the spirit and the scope of the claims. For example, the flow may deviate somewhat from absolute vertical and the flow may be assisted by an applied pressure gradient.

What is claimed is:

1. A method for removing condensable vapor from a gas stream comprising:
   (A) passing liquid cryogen into a condenser comprising a plurality of spaced vertically oriented cryogen passageways, each cryogen passageway having an outer surface, and a plurality of channels, each channel having an entrance and an exit and bordered at least in part by an outer surface of a cryogen passageway;
   (B) boiling the liquid cryogen within the condenser to produce cryogen vapor, and passing cryogen vapor upwardly within the cryogen passageways;
   (C) passing a gas stream containing condensable vapor into the condenser, directing the gas stream to the entrances of the channels, and distributing the gas stream for substantially equal flow within the channels;
   (D) passing the gas stream downwardly through the channels and condensing and freezing condensable vapor out from the gas stream onto the outer surfaces of the cryogen passageways to form a clean gas stream; and
   (E) withdrawing the clean gas stream from the exits of the channels.

2. The method of claim 1 wherein the liquid cryogen comprises liquid nitrogen.

3. The method of claim 1 wherein the gas stream comprises nitrogen gas.

4. The method of claim 1 wherein condensable vapor comprises water vapor.

5. The method of claim 1 wherein the cryogen vapor is passed in substantially equal flows within the cryogen passageways.

6. A cryogenic condenser comprising:
   (A) a housing containing a liquid cryogen reservoir and a plurality of spaced vertically oriented cryogen passageways, each cryogen passageway in flow communication with the liquid cryogen reservoir;
   (B) means for passing liquid cryogen from outside the housing into the liquid cryogen reservoir;
   (C) a gas stream inlet communicating with the housing, and a plurality of vertically oriented channels within the housing, each channel having an entrance and an exit;
   (D) means for directing a gas stream from the gas stream inlet to the entrances of the channels comprising a baffle which contacts the inside surface of the housing at the bottom and along the sides but not at the upper portion, and means for distributing the gas stream for substantially equal flow within the channels; and
   (E) a gas stream outlet for passing the gas stream collecting at the exits of the channels out from the housing.

7. The cryogen condenser of claim 6 wherein the cryogen passageways are formed respectively by a pair of vertically oriented plates.

8. A cryogenic condenser comprising:
   (A) a housing containing a liquid cryogen reservoir and a plurality of spaced vertically oriented cryogen passageways, each cryogen passageway in flow communication with the liquid cryogen reservoir;
   (B) means for passing liquid cryogen from outside the housing into the liquid cryogen reservoir;
   (C) a gas stream inlet communicating with the housing, and a plurality of vertically oriented channels within the housing, each channel having an entrance and an exit;
   (D) means for directing a gas stream from the gas stream inlet to the entrances of the channels, and means for distributing the gas stream for substantially equal flow within the channels comprising a plurality of baffles having different heights extending from the level of the entrances of the channels; and
   (E) a gas stream outlet for passing the gas stream collecting at the exits of the channels out from the housing.

9. The cryogenic condenser of claim 8 wherein the cryogen passageways are formed respectively by a pair of vertically oriented plates.

10. A cryogenic condenser comprising:
    (A) a housing containing a liquid cryogen reservoir and a plurality of spaced vertically oriented cryogen passageways, each cryogen passageway in flow communication with the liquid cryogen reservoir through a plurality of apertures having differing cross sectional areas;
    (B) means for passing liquid cryogen from outside the housing into the liquid cryogen reservoir;
    (C) a gas stream inlet communicating with the housing, and a plurality of vertically oriented channels within the housing, each channel having an entrance and an exit;
    (D) means for directing a gas stream from the gas stream inlet to the entrances of the channels, and means for distributing the gas stream for substantially equal flow within the channels; and
    (E) a gas stream outlet for passing the gas stream collecting at the exits of the channels out from the housing.

11. The cryogenic condenser of claim 10 wherein the cryogen passageways are formed respectively by a pair of vertically oriented plates.

* * * * *